United States Patent
Janson et al.

(10) Patent No.: US 10,081,239 B2
(45) Date of Patent: Sep. 25, 2018

(54) HYBRID TRANSAXLE

(71) Applicant: Ford Global Technologies, LLC, Dearborn, MI (US)

(72) Inventors: David Allen Janson, Plymouth, MI (US); Gregory Daniel Goleski, Rochester Hills, MI (US); David Gon Oh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 15/350,443

(22) Filed: Nov. 14, 2016

(65) Prior Publication Data

US 2018/0134142 A1    May 17, 2018

(51) Int. Cl.
*B60K 6/44* (2007.10)
*F16H 37/08* (2006.01)
*B60K 6/365* (2007.10)
*B60K 6/40* (2007.10)

(52) U.S. Cl.
CPC ............... *B60K 6/44* (2013.01); *B60K 6/365* (2013.01); *B60K 6/40* (2013.01); *F16H 37/0806* (2013.01); *F16H 37/0833* (2013.01); *B60Y 2200/92* (2013.01); *B60Y 2400/73* (2013.01); *Y10S 903/91* (2013.01); *Y10S 903/951* (2013.01)

(58) Field of Classification Search
CPC .. B60K 6/44; B60K 6/365; B60K 6/40; F16H 37/0833; F16H 37/0806; Y10S 903/91; Y10S 903/951; B60Y 2400/73; B60Y 2200/92

USPC .................... 475/5, 221, 204, 205
See application file for complete search history.

(56) References Cited

U.S. PATENT DOCUMENTS

| | | | |
|---|---|---|---|
| 3,744,760 A * | 7/1973 | Uher | B66D 1/16 192/12 B |
| 6,429,541 B2 | 8/2002 | Takenaka et al. | |
| 7,128,677 B2 * | 10/2006 | Supina | B60K 6/365 475/5 |
| 7,195,574 B2 * | 3/2007 | Mattsson | B60K 6/445 475/5 |
| 7,246,672 B2 | 7/2007 | Shirai et al. | |
| 7,455,135 B2 | 11/2008 | Janson et al. | |
| 8,125,169 B2 * | 2/2012 | Ogino | B60W 20/13 180/65.285 |
| 8,491,432 B2 | 7/2013 | Radermacher et al. | |
| 9,017,203 B2 * | 4/2015 | Tamai | B60K 6/365 180/65.225 |
| 9,126,581 B2 | 9/2015 | Swales et al. | |

(Continued)

FOREIGN PATENT DOCUMENTS

WO    2015097510 A1    7/2015

*Primary Examiner* — Roger L Pang
(74) *Attorney, Agent, or Firm* — David B. Kelley; Brooks Kushman P.C.

(57) ABSTRACT

Two hybrid transaxles permit location of a traction motor in a more favorable location, decreasing the risk of occupant injury in a vehicle collision. Each transaxle uses a direction preserving power transfer mechanism to transfer power from the traction motor to a countershaft such that the countershaft rotates in the same direction as the traction motor. Each of the power transfer mechanisms permit more freedom of location for the traction motor axis than would be possible with a single gear pair or a mechanism that uses gearing on the input axis.

11 Claims, 4 Drawing Sheets

(56) References Cited

U.S. PATENT DOCUMENTS

2016/0250913 A1    9/2016  Hirano et al.
2018/0031112 A1*  2/2018  Chae ...................... F16H 57/08

\* cited by examiner

HYBRID TRANSAXLE

TECHNICAL FIELD

This disclosure relates to the field of vehicle transmissions. More particularly, the disclosure pertains to an arrangement of components in a hybrid transaxle.

BACKGROUND

Hybrid powertrains include energy storage devices such as batteries which are utilized to reduce fuel consumption by capturing braking energy and by permitting more efficient use of an internal combustion engine. The engine may be shut off while the vehicle is stationary. Also, the engine may be operated at higher power setting at which it is typically more efficient and then shut off a portion of the time that the vehicle is moving.

One type of hybrid powertrain is an electric power-split hybrid. At low speed, a planetary gear set divides the mechanical power generated by the internal combustion engine into two power flow paths. A portion of the power is conveyed to the drive wheels by gears, chains, or other mechanical power transfer components. The remaining power is directed to an electric machine and converted into electrical power. This electric machine is typically referred to as a generator although it may also be capable converting electrical power into mechanical power. A second electric machine drives the drive wheels. This second machine is typically referred to as a traction motor although it may be capable of converting mechanical power into electrical power. In some operating modes, all electrical power from the generator flows to the traction motor. In other operating modes, some electrical power may be diverted to a battery. In yet other operating modes, the battery may supplement the electrical power.

In a front wheel drive hybrid transaxle, the engine crankshaft rotates about an axis that is offset from and substantially parallel to an axle axis. The transaxle includes a differential on the axle axis which divides the power between left and right half-shafts that may rotate at slightly different speeds as the vehicle turns a corner. The space available for the transaxle is restricted by the size of the engine compartment and the space occupied by the engine. Even space which may not be occupied by other components may not be available due to considerations of how objects in that space would impact the passenger compartment in a collision.

SUMMARY OF THE DISCLOSURE

A hybrid transaxle includes a plantary gear set, a countershaft, first and second electric machines, and a direction preserving power transfer mechanism. The planetary gear set is arranged on a first axis and includes a sun gear fixedly coupled to the first electric machine, a carrier fixedly coupled to an input shaft, and a ring gear fixedly coupled to a first gear. The countershaft is arranged on a second axis offset from the first axis and is fixedly coupled to a second gear meshing with the first gear. The second electric machine is arranged on a third axis offset from the first and second axes. The direction preserving power transfer mechanism drivably connects the second electric machine to the countershaft while bypassing the first axis. The direction preserving power transfer mechanism may be, for example, a first sprocket fixedly coupled to the second electric machine, a second sprocket fixedly coupled to the countershaft, and a chain engaging the first and second sprockets. As another example, the direction preserving power transfer mechanism may be a gear triple including an idler gear supported for rotation about a fourth axis offset from the first through third axes, a third gear fixedly coupled to the second electric machine, and a fourth gear fixedly coupled to the countershaft wherein the third and fourth gears each mesh with the idler gear. A differential may be arranged on a fifth axis offset from the first through third axes. A fifth gear may be fixedly coupled the countershaft and may mesh with a sixth gear fixedly coupled to a carrier of the differential.

In another embodiment, a hybrid transaxle includes a planetary gear set, a countershaft, first and second electric machines, a differential, and a direction preserving power transfer mechanism. The planetary gear set is arranged on a first axis and includes a first element fixedly coupled the first electric machine, a second element fixedly coupled to an input shaft, and a third element fixedly coupled to a first gear. For example, the first element may be a sun gear, the second element may be a carrier, and the third element may be a ring gear. The countershaft is arranged on a second axis and fixedly coupled to a second gear meshing with the first gear. A third gear is also fixedly coupled to the countershaft. The second electric machine is arranged on a third axis and the differential is arranged on a fourth axis. A fourth gear, meshing with the third gear, is fixedly coupled to a carrier of the differential. The direction preserving power transfer mechanism driveably connects the second electric machine to the countershaft while bypassing the first axis. The direction preserving power transfer mechanism may be, for example, a first sprocket fixedly coupled to the second electric machine, a second sprocket fixedly coupled to the countershaft, and a chain engaging the first and second sprockets. As another example, the direction preserving power transfer mechanism may be a gear triple including an idler gear supported for rotation about a fifth axis, a fifth gear fixedly coupled to the second electric machine, and a sixth gear fixedly coupled to the countershaft wherein the fifth and sixth gears each mesh with the idler gear.

In yet another embodiment, a hybrid transaxle includes a planetary gear set, a countershaft, first and second electric machines, first and second sprockets, and a chain. The planetary gear set includes a sun gear fixedly coupled to the first electric machine, a carrier fixedly coupled to an input shaft, and a ring gear fixedly coupled to first gear. The countershaft is fixedly coupled to a first sprocket and to a second gear meshing with the first gear. A second sprocket is fixedly coupled to the second electric machine. The chain engages both the first and second sprockets. The hybrid transaxle may also include a third gear fixedly coupled to the countershaft and meshing with a fourth gear fixedly coupled to a differential carrier. The components may be supported about four offset axes. Specifically, the first electric machine may be supported on a first axis, the second electric machine may be supported on a second axis, the countershaft may be supported on a third axis, and the differential carrier may be supported on a fourth axis.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotatable elements are fixedly coupled to one another if they are constrained to have the same rotational speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two or more rotatable elements are selectively coupled by a shift element when the shift element constrains them to have the same rotational speed about the same axis whenever it is fully engaged and they are free to have distinct speeds in at least some other operating condition. Two rotatable elements are driveably connected if they are connected by a power flow path that constrains their rotation speeds to be proportional with a predetermined speed ratio. If the power flow path is established in all operating conditions, then the components are fixedly driveably connected. If the power flow path is established only when one or more shift elements are engaged, then the components are selectively driveably connected.

Figure 1:
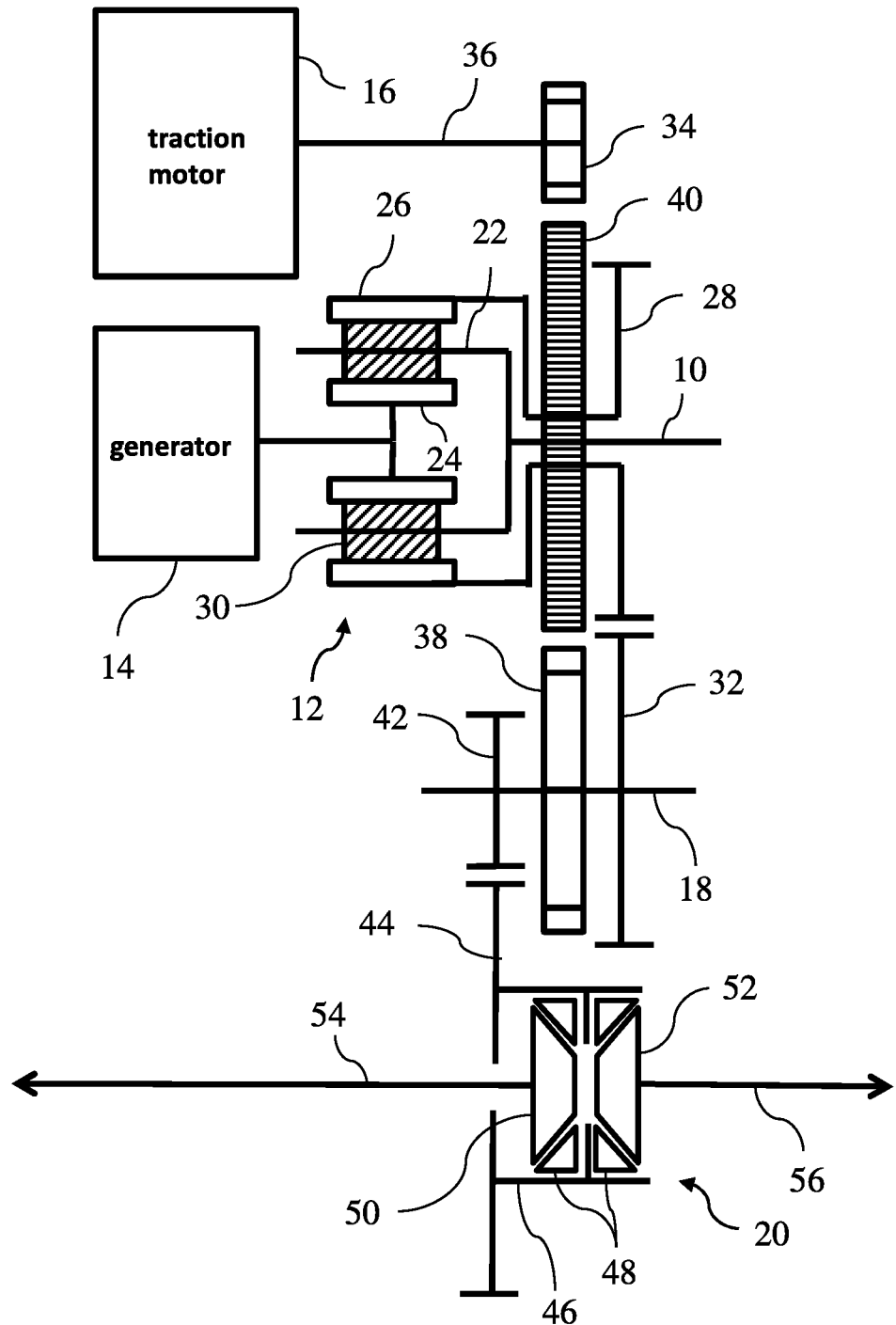
FIG. 1 is a schematic diagram of a four axis power-split hybrid transaxle utilizing a chain and sprockets to transfer power from a traction motor to a countershaft.
Figure 2:
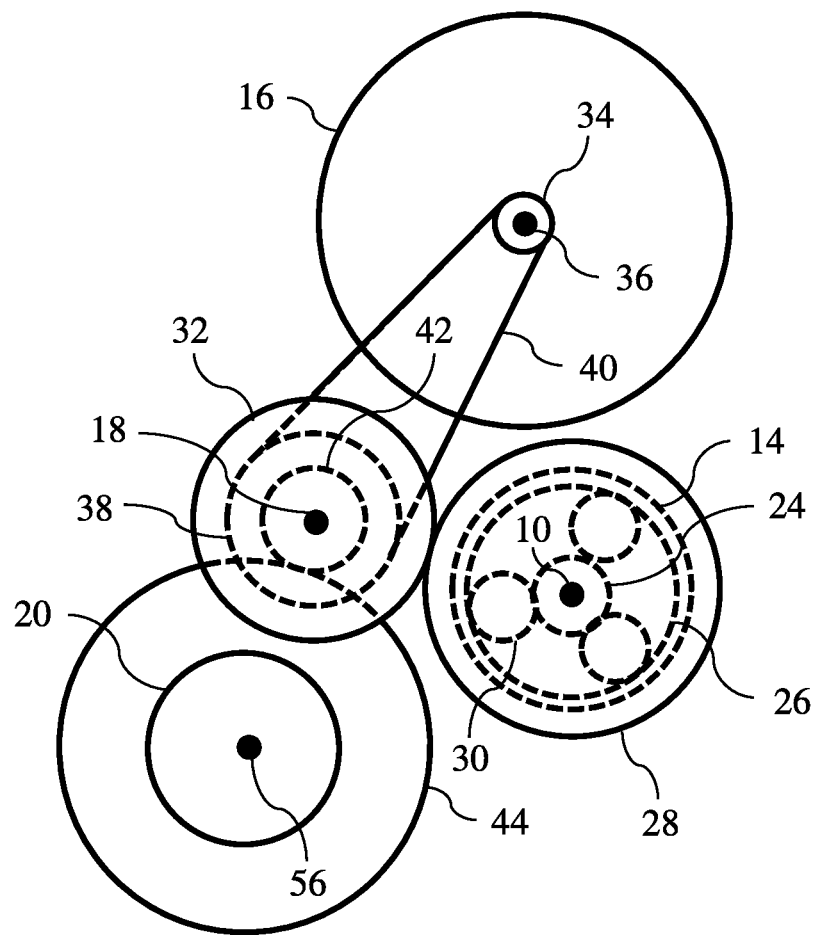
FIG. 2 is an end-view of the transaxle of FIG. 1.

FIGS. 1 and 2 illustrate a kinematic arrangement for a power-split hybrid transaxle. Power from an internal combustion engine is provides at input shaft 10. At relatively low vehicle speeds, this power is split into two power flow paths by planetary gear set 12. One of the power flow paths is entirely mechanical. In the other power flow path, mechanical power is converted into electrical power by generator 14 and then converted back into mechanical power by traction motor 16. In some operating conditions, some power in this electrical power flow path may be diverted to a battery for later use. In other operating conditions, power from the battery may be added to the electrical power flow path. The power of the two power flow paths is combined at countershaft 18 before being delivered to vehicle wheels via differential 20. Generator 14 and traction motor 16 are both reversible electric machines capable of converting mechanical power into electrical power and vice versa. They may be, for example, synchronous AC motors connected to a DC bus via corresponding inverters. At higher vehicle speeds, power may flow in the opposite direction in the electrical power flow path, establishing a recirculating power condition.

The carrier 22 of planetary gear set 12 is fixedly coupled to input shaft 10. The sun gear 24 is fixedly coupled to the rotor of generator 14. Ring gear 26 is fixedly coupled to a first gear 28. In alternative embodiments, some of these connections may be reversed, such as connecting the first gear to the carrier while connecting the input shaft to the ring. The input shaft 10, the rotor of generator 14, first gear 28, sun gear 24, carrier 22, and ring gear 26 are all supported for rotation about a first axis. A set of planet gears 30 is supported for rotation with respect to carrier 22 and meshes with both sun gear 24 and ring gear 26.

Countershaft 18 is supported for rotation about a second axis parallel to and offset from the first axis. Second gear 32 is fixedly coupled to the countershaft 18 and meshes with first gear 28. First gear 28 and second gear 32 constitute the mechanical power flow path. The rotor of traction motor 16 is supported for rotation about a third axis parallel to and offset from the first and second axes. First sprocket 34 is fixedly coupled to a rotor shaft 36 of traction motor 16. Second sprocket 38 is fixedly coupled to countershaft 18. Chain 40 engages the first and second sprockets to transfer mechanical power from the traction motor to the countershaft. Second sprocket 38 is substantially larger in diameter than first sprocket 34, thus eliminating the need for other torque multiplication components.

A third gear 42 is fixedly coupled to countershaft 18 and meshes with a fourth gear 44. The fourth gear 44 is fixedly coupled to a carrier 46 of the differential 20. A number of beveled planet gears 48 are supported for rotation with respect to differential carrier 46. The beveled planet gears each mesh with both left and right beveled side gears 50 and 52. The left and right side gears 50 and 52 are fixedly coupled to left and right half-shafts 54 and 56, respectively to transfer power to left and right wheels. Fourth gear 44, differential carrier 46, and left and right side gears 50 and 52 are all supported for rotation about a fourth axis. Left and right half-shaft 54 and 56 may include universal joints to accommodate slight differences between the fourth axis and the axes of rotation of the left and right wheels.

In general, it is advantageous to have a transaxle that is compact in both the radial direction and the axial direction. However, the relative locations of the first, second, and third axes must satisfy a number of constraints. Placing the generator and the traction motor at the same axial position reduces the axial length of the transaxle. In order to place them side by side, the separation between the first axis and the third axis must be sufficient. When gears are used to transfer power between axes, the diameters of the gears is related to the distance between the axes. In order to provide torque multiplication, the driven gear must be substantially larger than the driving gear. A large driven gear may interfere with components on other axes unless the axes are spaced far apart or the components on different axes are staggered axially. Using a chain and sprockets, on the other hand, allows more freedom to place the axes wherever space is available in the underhood vehicle environment. Thus, traction motor 16 can be placed further forward in the arrangement of FIGS. 1 and 2 than it could be if a layshaft gear pair were used to transfer the power to the countershaft. Simulations of vehicle crash scenarios has indicated that positioning the traction motor further forward reduces the risk of occupant injury in an accident.

Components that are driveably connected via a chain and sprocket rotate in the same direction as one another. Layshaft gear pairs like gears 28 and 32 or 42 and 44, on the other hand, reverse the direction of rotation. Consequently, traction motor 16 rotates in the opposite direction of the wheels. For a power source like an internal combustion engine, such a direction reversal would preclude proper operation. However, since electric machines have approximately the same characteristics in each direction, this is not a problem.

Figure 3:
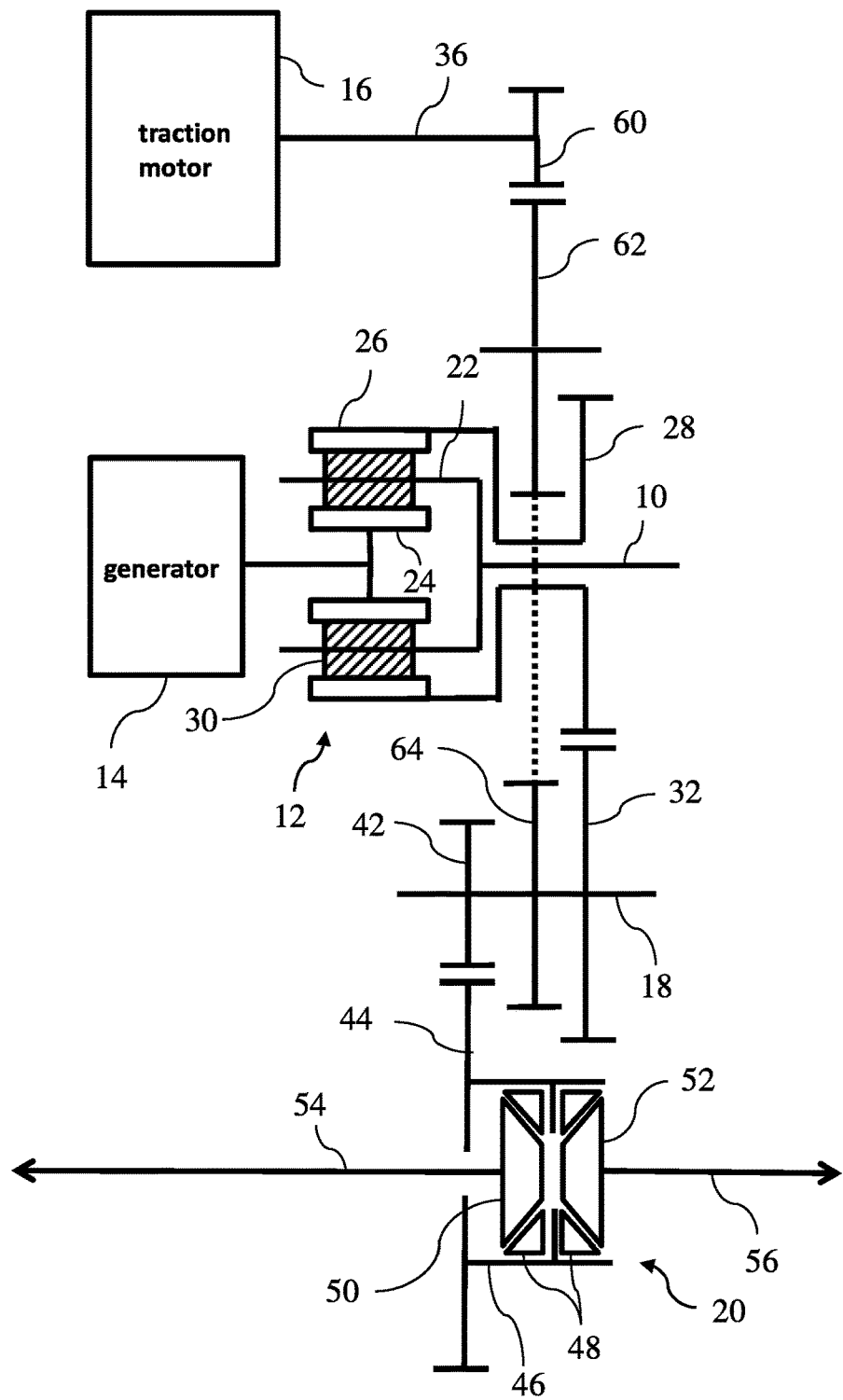
FIG. 3 is a schematic diagram of a five axis power-split hybrid transaxle utilizing a gear triple to transfer power from a traction motor to a countershaft.
Figure 4:
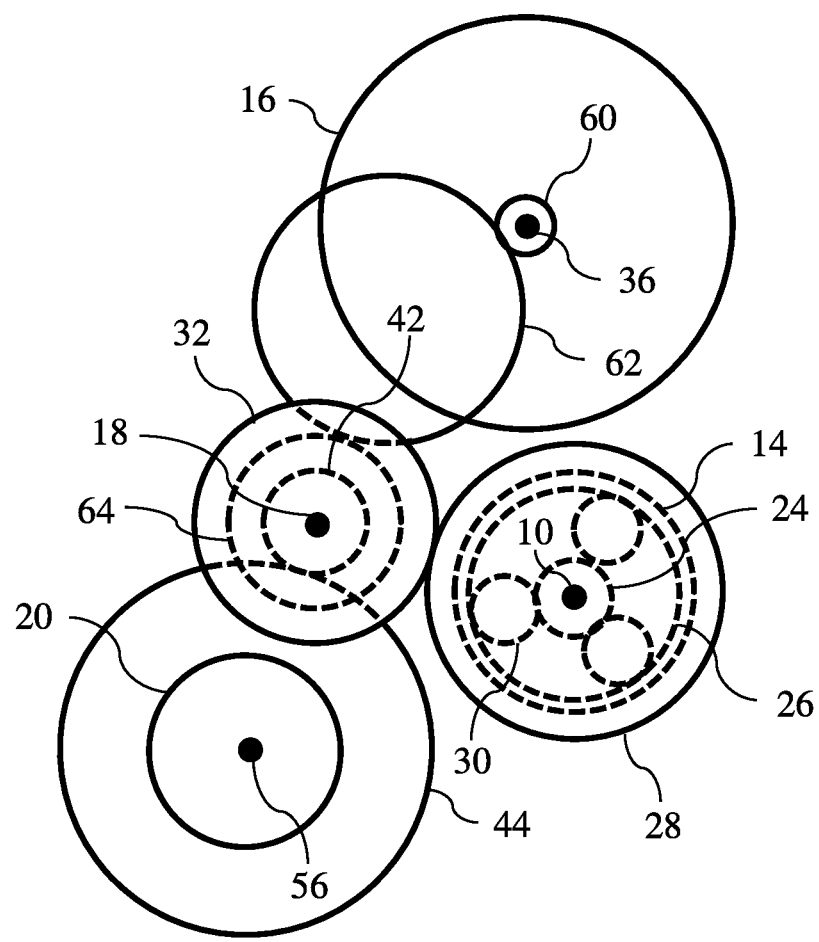
FIG. 4 is an end-view of the transaxle of FIG. 3.

FIGS. 3 and 4 illustrate an alternate kinematic arrangement for a power-split hybrid transaxle. A layshaft gear triple is used in placed of the sprocket and chain assembly of FIGS. 1 and 2. Gear 60 is fixedly coupled to traction motor rotor shaft 36. Idler gear 62 is supported for rotation about a fifth axis and meshes with gear 60. Gear 64 is fixedly coupled to countershaft 18 and meshes with idler gear 62 as indicated by the dotted line in FIG. 3. A gear triple, like a chain and sprocket assembly, is a direction preserving power transfer mechanism. Also like a chain and sprocket, a layshaft gear triple is able to span a relatively large distance between axes of rotation of traction motor 16 and countershaft 18, thus permitting traction motor 16 to be placed farther forward in the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A hybrid transaxle comprising:
    a planetary gear set arranged on a first axis and having a sun gear fixedly coupled to a first electric machine, a carrier fixedly coupled to an input shaft, and a ring gear fixedly coupled to a first gear;
    a countershaft arranged on a second axis offset from the first axis and fixedly coupled to a second gear meshing with the first gear;
    a second electric machine arranged on a third axis offset from the first and second axes;
    a differential arranged on a fifth axis offset from the first, second, and third axes; and
    a direction preserving power transfer mechanism driveably connecting the second electric machine to the countershaft and bypassing the first and fifth axes.

2. The hybrid transaxle of claim 1 wherein the direction preserving power transfer mechanism comprises:
    a first sprocket fixedly coupled to the second electric machine;
    a second sprocket fixedly coupled to the countershaft; and
    a chain engaging the first and second sprockets.

3. The hybrid transaxle of claim 1 wherein the direction preserving power transfer mechanism comprises:
    an idler gear supported for rotation about a fourth axis offset from the first, second, and third axes;
    a third gear fixedly coupled to the second electric machine and meshing with the idler gear; and
    a fourth gear fixedly coupled to the countershaft and meshing with the idler gear.

4. The hybrid transaxle of claim 1 further comprising:
    a fifth gear fixedly coupled to the countershaft; and
    a sixth gear fixedly coupled to a carrier of the differential and meshing with the fifth gear.

5. A hybrid transaxle comprising:
    a planetary gear set arranged on a first axis and having a first element fixedly coupled to a first electric machine, a second element fixedly coupled to an input shaft, and a third element fixedly coupled to a first gear;
    a countershaft arranged on a second axis offset from the first axis and fixedly coupled to a second gear and to a third gear, the second gear meshing with the first gear;
    a second electric machine arranged on a third axis offset from the first and second axes;
    a differential arranged on a fourth axis offset from the first, second, and third axes;
    a fourth gear fixedly coupled to a carrier of the differential and meshing with the third gear; and
    a direction preserving power transfer mechanism driveably connecting the second electric machine to the countershaft and bypassing the first and fourth axes.

6. The hybrid transaxle of claim 5 wherein:
    the first element is a sun gear;
    the second element is a carrier; and
    the third element is a ring gear.

7. The hybrid transaxle of claim 5 wherein the direction preserving power transfer mechanism comprises:
    a first sprocket fixedly coupled to the second electric machine;
    a second sprocket fixedly coupled to the countershaft; and
    a chain engaging the first and second sprockets.

8. The hybrid transaxle of claim 5 wherein the direction preserving power transfer mechanism comprises:
    an idler gear supported for rotation about a fifth axis offset from the first, second, third, and fourth axes;
    a fifth gear fixedly coupled to the second electric machine and meshing with the idler gear; and
    a sixth gear fixedly coupled to the countershaft and meshing with the idler gear.

9. A hybrid transaxle comprising:
    a planetary gear set having a sun gear fixedly coupled to a first electric machine, a carrier fixedly coupled to an input shaft, and a ring gear fixedly coupled to a first gear;
    a countershaft fixedly coupled to a first sprocket and to a second gear meshing with the first gear;
    a second electric machine fixedly coupled to a second sprocket; and
    a chain engaging the first and second sprockets.

10. The hybrid transaxle of claim 9 further comprising a third gear fixedly coupled to the countershaft and meshing with a fourth gear fixedly coupled to a differential carrier.

11. The hybrid transaxle of claim 10 wherein:
    the first electric machine is supported on a first axis;
    the second electric machine is supported on a second axis parallel to and offset from the first axis;
    the countershaft is supported on a third axis parallel to and offset from the first and second axes; and
    the differential carrier is supported on a fourth axis parallel to and offset from the first, second, and third axes.

* * * * *